June 11, 1929.　　　　J. C. LARSEN　　　　1,717,045
SIDE BEARING FOR CAR TRUCKS
Filed April 23, 1926　　2 Sheets-Sheet 2
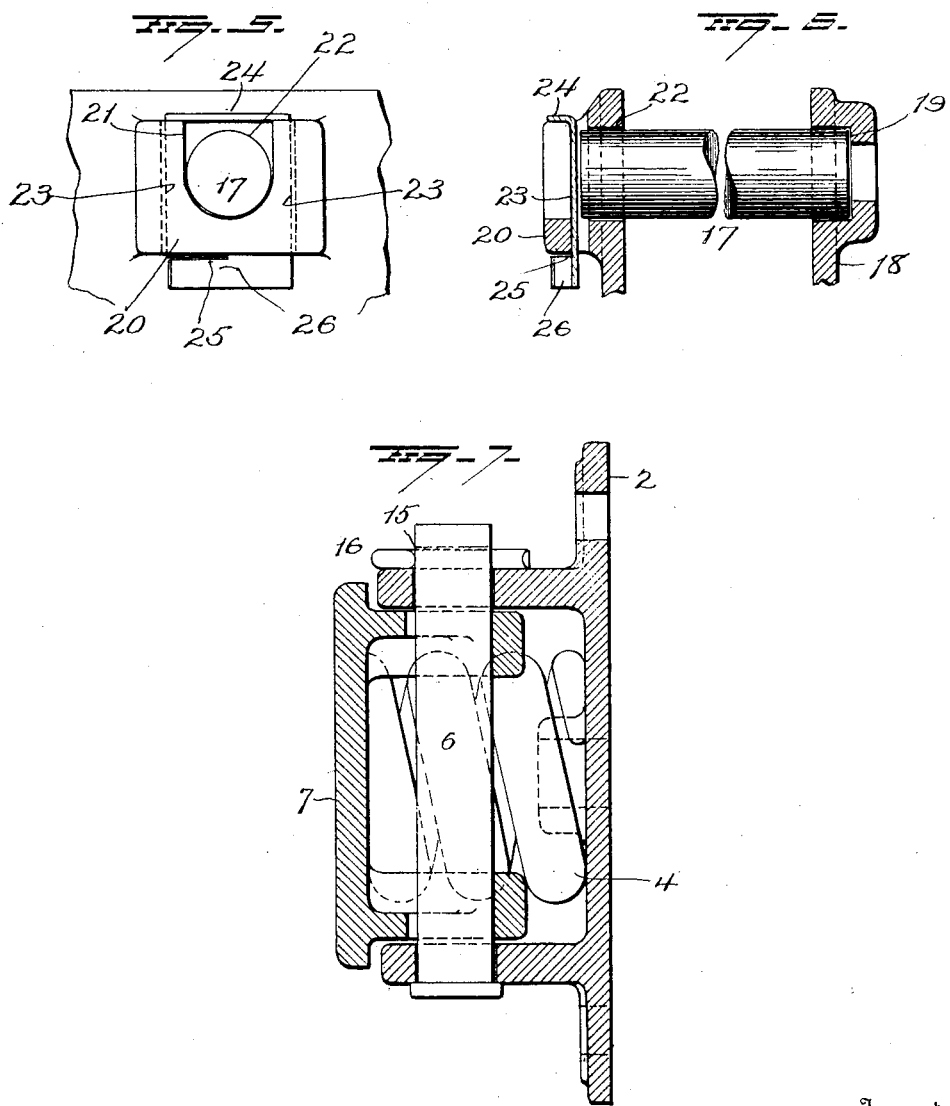

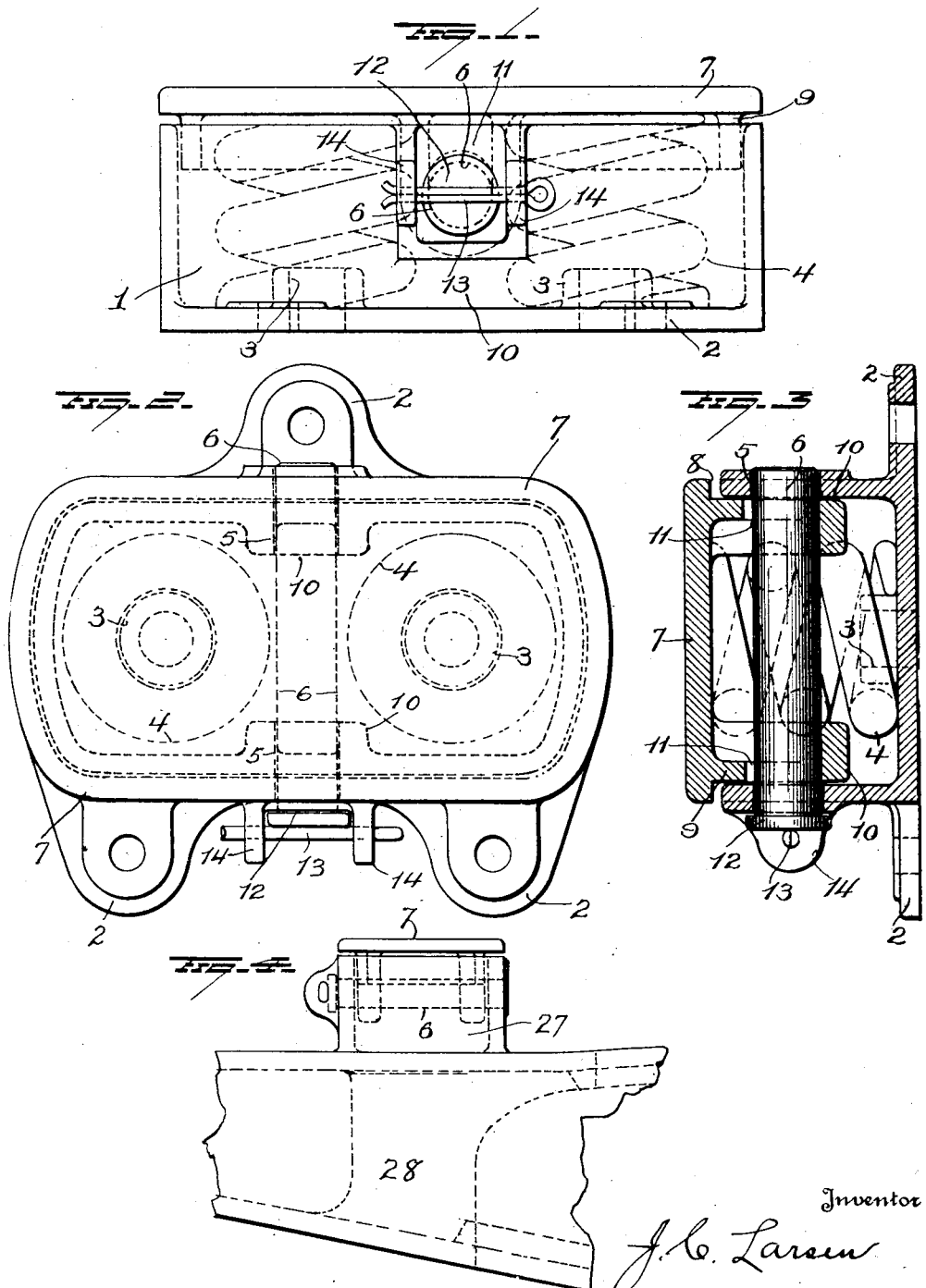

Patented June 11, 1929.

1,717,045

UNITED STATES PATENT OFFICE.

JACOB C. LARSEN, OF COLUMBUS, OHIO, ASSIGNOR TO THE BUCKEYE STEEL CASTINGS COMPANY, OF COLUMBUS, OHIO.

SIDE BEARING FOR CAR TRUCKS.

Application filed April 23, 1926. Serial No. 104,118.

This invention relates to side bearings for car trucks and has special reference to side bearings of the cushioning type, in which the cushioning elements are maintained under an initial compression.

The purpose of cushioning side bearings is to check the oscillations of the car body which are caused by imperfect track conditions and which, under a condition of rigid body construction and a high center of gravity of the loaded car, are very severe and interfere with the safe operation of the car. The introduction of an intermediate spring action between the body bolster and the truck bolster tends to break the sharp blows on the truck bolster and prevents the bolster springs from receiving the frequent over solid blows which cause spring failures.

The oscillation of the car body is caused by successive impulses or blows that occur as the wheels of one side of a truck pass over the more yielding portions of the track, as at the rail joints.

The rail joints being spaced at uniform intervals cause the above mentioned blows or impulses to be applied at equal time intervals when the speed of the car is uniform.

The mass supported by the truck springs is subject to a definite period of oscillation which is a function of various factors such as weight of car, car dimensions, and truck spring properties.

If the speed of the car be such that the impulses from the rail joints synchronize with the period of oscillation of the car, then the swaying of the car body becomes accumulative to the point where the wheel load on one side of the truck is momentarily reduced to zero. This condition contributes very seriously to failures of truck springs and when on curved track, it frequently causes derailments.

The speed at which the swaying becomes accumulative is termed the critical speed of the car. The common lengths of rails and the usual spacing of car trucks, together with the standard type truck springs, by coincidence form a combination which establish a critical speed that is quite regularly attained and maintained in freight service.

By the use of the cushoning side bearing, as herein described, a disturbing element is introduced which prevents the synchronism between the timing of impulses from the rail joints and the periodic oscillation of the car, thereby preventing oscillations of the car body from becoming accumulative to any appreciable degree.

With the ordinary type of solid side bearings, it is difficult to maintain normal clearance between the side bearings on the truck and body because the severe impact of the rocking car body causes local deformation in the body bolster, the truck bolster, and the side bearing elements. Consequently, many cars are operated with excessive side bearing clearance, thereby adding to the risk of derailment from excessive rocking of car body. The present invention provides a side bearing having springs under a suitable degree of initial compression so arranged and housed that they will not be compressed to solidity under the maximum travel of the movable member of the bearing and the maintenance cost of the springs will be reduced, therefore, to a negligible quantity, while the springs will be maintained in such a state of compression that they will set up sufficient interference with the usual swaying tendencies of the car body to check the oscillations before they have accumulated to any considerable amount.

In the accompanying drawing:

Figure 1 is a view in elevation of a side bearing embodying the present invention;

Figure 2 is a plan view of the same;

Figure 3 is a section taken in the vertical plane of the retaining pin of the same;

Figure 4 is a detail elevation showing a cushioning side bearing box cast integral with the truck bolster;

Figure 5 is a detail end view, and Figure 6 is a detail section showing a variation in the means for securing the retaining pin;

Figure 7 is a detail showing a further variation for retaining the pin.

The side bearing includes a box or lower member 1 having an open top and, in the form shown in Figs. 1, 2 and 3, provided with base lugs or flanges 2 through which rivets, bolts, or the like may be inserted to secure the device upon a truck or, in inverted position, upon the car body. Between its center and its ends, bosses 3 are formed upon the floor or bottom of the box for centering the springs 4 and preventing bodily shifting of the same, and in the sides of the box or lower casting, at the center thereof, are circular openings 5 through which the retaining pin 6 may be inserted. Resting upon the springs 4 is a follower or thrust plate 7 having its margin overlapping the sides and ends of the box, as at 8, so as to rest thereon in lowered position, and having a depending rim or flange 9 which fits closely within the box to guide the follower in its movement and maintain its alinement with the box. On its sides, at the center, tongues 10 depend from the plunger, said tongues having vertical slots 11 therein to receive the retaining pin 6 by which the springs are held under the desired initial compression. In the form shown in Figs. 1, 2 and 3, the pin is formed with a head 12 which, by impinging against the side of the box, limits the insertion of the pin so that its proper engagement with and retention of the plunger will be made certain. To retain the pin, when springs are compressed beyond the amount of the initial compression, a key 13 is secured in lugs 14 on the box so as to pass diametrically across the head of the pin, as clearly shown. In this arrangement, the pin is of such length that, when in place, its entrance end will lie flush with the side of the box, but, if the lugs 14 be considered objectionable, the pin may be made longer and provided with a diametrical opening 15 at its free end through which a key 16 may be inserted to bear against the side of the box, as shown in Fig. 7.

In Figures 5 and 6 I have shown how a retaining pin 17 without a head may be used. In this arrangement, one side, 18, of the box has a recess or socket 19 in its inner face in which one end of the pin is received and supported and by which the inserting endwise movement is limited. Upon the opposite side of the box is an external U-shaped projection or saddle-like bracket 20 having its intermediate portion spaced from the box by its side portions, openings 21 and 22 being formed through the bracket and the side of the box, respectively, in axial alinement with the socket 19 to permit insertion of the pin. After the pin is in place, a key in the form of a plate 23 having an overhanging flange 24 at its upper end and slitted, as at 25, near its lower end, is inserted downwardly between the end of the pin and the body of the bracket so that it will cover the opening 21 and the flange 24 will rest on the upper end of the bracket. The tongue 26, below the slit 25, is then bent outward below the bracket, thereby locking the key in place.

The construction of this side bearing is very simple and the box may be cast readily as an integral part of the truck bolster. In Fig. 4, the box 27 is cast integral with the top of the truck bolster 28.

The retaining pin forms a simple connection between the box and the plunger, and the parts may be easily assembled and disassembled. The retaining pin restrains the cap or follower so that it may move vertically but the springs, while always maintained under compression, will not be compressed to solidarity hence they will always be in proper condition to quickly check the oscillations of the car body.

It will be understood that, in assembling the parts, after the springs are in the box, the follower or cover is placed over the springs and subjected to pressure in any convenient manner to initially compress the springs. While the pressure upon the follower and springs is maintained, the pin is inserted and locked, whereupon the pressure is withdrawn, leaving the follower resting on and supported by the springs. The opposed side bearings on the body and the bolster are disposed just out of contact so that there will be clearance under normal conditions and oscillations will be quickly checked when the body tends to sway. The form and proportions are such that projections on the side of the box are minimized and the device is not apt to be rendered inoperative by chance blows. As a single pin retains both sides of the follower, the assembling of the parts is facilitated and the maintenance of the proper relation between the follower and the box is assured.

Having fully described my invention what I claim as new and desire to secure by Letters-Patent, is:—

A side bearing comprising a box, springs seated in the box under compression, a follower resting on the springs and having a rim on its under side fitting closely and slidably within the box, the follower being further provided with pendant vertically slotted tongues at opposite edges within the box, a single pin seating in the sides of the box and passing through the slots in said tongues, and means on a side of the box for locking the pin in place.

In testimony whereof, I have signed this specification.

JACOB C. LARSEN.